United States Patent [19]

Kuckes

[11] Patent Number: 4,933,640

[45] Date of Patent: Jun. 12, 1990

[54] APPARATUS FOR LOCATING AN ELONGATED CONDUCTIVE BODY BY ELECTROMAGNETIC MEASUREMENT WHILE DRILLING

[75] Inventor: Arthur F. Kuckes, Ithaca, N.Y.

[73] Assignee: Vector Magnetics, Ithaca, N.Y.

[21] Appl. No.: 292,242

[22] Filed: Dec. 30, 1988

[51] Int. Cl.⁵ .......................... G01V 3/28; G01V 3/08; E21B 7/04; E21B 47/02

[52] U.S. Cl. .................................... 324/339; 166/66.5; 166/250; 175/45; 175/50; 324/342; 324/343; 324/346

[58] Field of Search ............................... 324/338–343, 324/346; 175/40, 45, 50; 166/250, 255, 254, 66.5; 33/304, 312

[56] References Cited

U.S. PATENT DOCUMENTS

| | | |
|---|---|---|
| 2,264,318 | 12/1941 | Lee . |
| 2,411,696 | 11/1946 | Silverman et al. . |
| 2,759,143 | 8/1956 | Arps . |
| 2,987,668 | 6/1961 | Gondouin . |
| 3,186,222 | 6/1965 | Martin . |
| 3,282,355 | 11/1966 | Henderson . |
| 3,305,771 | 2/1967 | Arps .................................. 324/342 |
| 3,408,561 | 10/1968 | Redwine et al. ..................... 324/342 |
| 3,493,850 | 2/1970 | Schuster .............................. 324/342 |
| 4,072,200 | 2/1978 | Morris et al. .................... 324/346 X |
| 4,323,848 | 4/1982 | Kuckes ................................ 324/338 |
| 4,348,672 | 9/1982 | Givler .............................. 175/40 X |
| 4,372,398 | 2/1983 | Kuckes ........................... 324/346 X |
| 4,387,372 | 6/1983 | Smith et al. ...................... 175/40 X |
| 4,400,858 | 8/1983 | Goiffon et al. . |
| 4,443,762 | 4/1984 | Kuckes ............................... 324/346 |
| 4,458,767 | 7/1984 | Hoehn .............................. 175/45 X |
| 4,468,665 | 8/1984 | Thawley et al. . |
| 4,496,174 | 1/1985 | McDonald et al. . |
| 4,525,715 | 6/1985 | Smith . |
| 4,529,939 | 7/1985 | Kuckes ............................... 324/346 |
| 4,553,097 | 11/1985 | Clark .............................. 324/342 X |
| 4,651,101 | 3/1987 | Barber et al. ....................... 324/339 |
| 4,700,142 | 10/1987 | Kuckes ............................... 324/346 |
| 4,725,837 | 2/1988 | Rubin ............................... 175/50 X |
| 4,748,415 | 5/1988 | Vail, III .......................... 324/346 X |

OTHER PUBLICATIONS

"Geophysical Well Logging" excerpted from Methods of Experimental Physics, vol. 24: Geophysics: Jay Tittman 1986.

"Well Logging for Physical Properties" J. Hearst, Ph.D. & Philip H. Nelson, Ph.D. 1985, McGraw-Hill Book Co.

"Magnetic Well Logging" Geophysics, vol. XVII, No. 1, Jan. 1952: Broding et al.

"Magnetostatic Methods for Estimating Distance and Direction from a Relief Well to a Cased Wellbore"; Journal of Petroleum Technology: Robinson & Vogiatzis; Jun. 1972.

"Drilling by Direction" The Lamp 1984, vol. 66, No. 3; pp. 25–29.

"Successful ELREC Logging for Casing Proximity in an Offshore Louisiana Blowout" SPE 11996; C. L. West, Kuckes & Ritch 1983.

"An Electromagnetic Survey Method for Directionally Drilling a Relief Well into a Blown Out Oil or Gas Well" Society of Petroleum Engineers Journal, pp. 269–274, Kuckes et al.; Jun. 1984.

Primary Examiner—Gerard R. Strecker
Attorney, Agent, or Firm—Jones, Tullar & Cooper

[57] ABSTRACT

A method and apparatus for determining the distance and direction of a well from a borehole. A toroidal inductor surrounds a drill stem within a borehole. The inductor acts as a primary for a transformer, with the drill stem, the earth surrounding the borehole, and electrically conductive material at the target well forming a single loop transformer secondary. An oscillator is connected to the primary to produce an induced AC current in the secondary. Secondary current flowing in the target well produces an AC secondary magnetic field which is detected at the borehole.

28 Claims, 6 Drawing Sheets

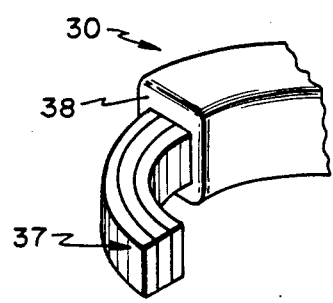
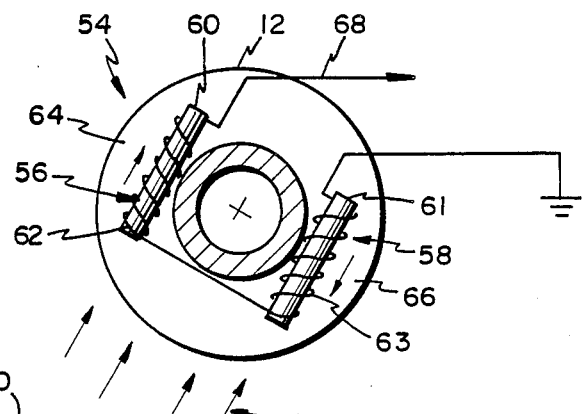
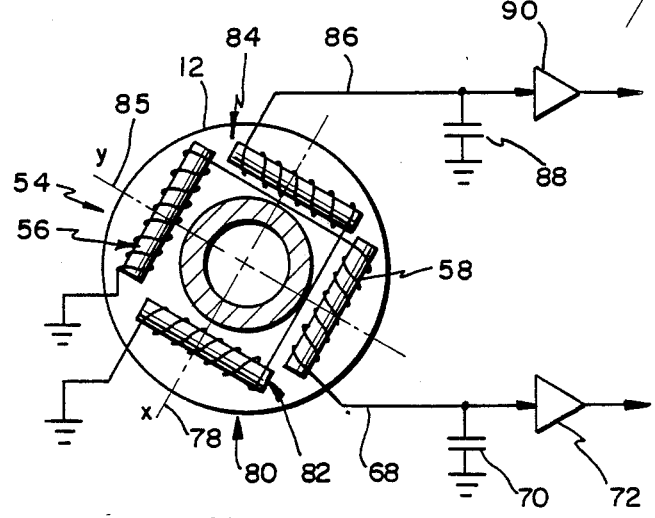
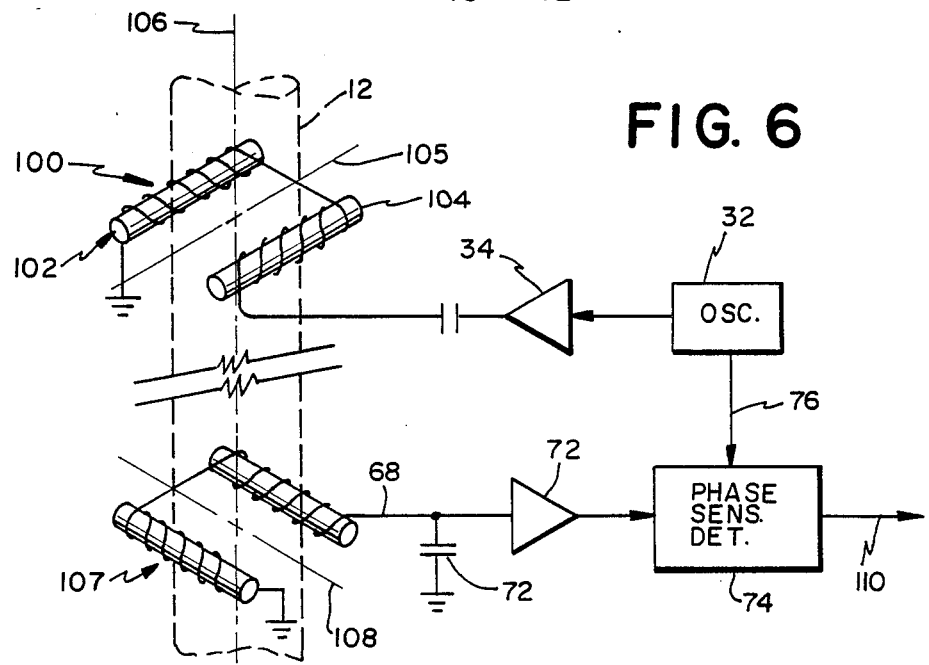

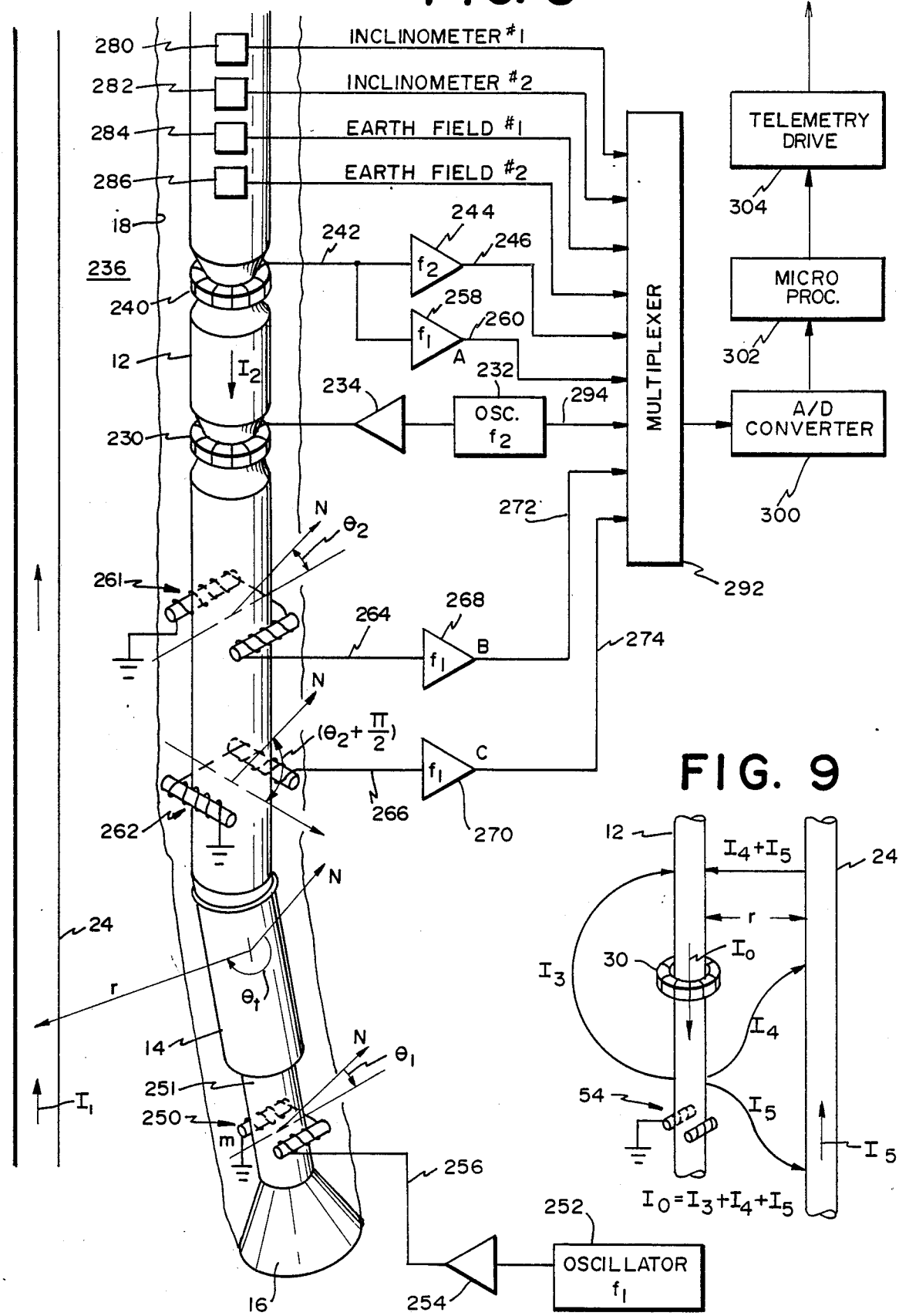

APPARATUS FOR LOCATING AN ELONGATED CONDUCTIVE BODY BY ELECTROMAGNETIC MEASUREMENT WHILE DRILLING

BACKGROUND OF THE INVENTION

The present invention relates, in general, to downhole well detection, and more particularly to electromagnetic systems for downhole proximity detection while drilling.

In any drilling of boreholes in the earth, such as drilling oil and gas wells or drilling relief boreholes, it is essential for the driller to have as much information as possible about the location of the well being drilled with respect to surrounding strata and more particularly with respect to other wells which might be in the vicinity. For example, serious safety problems are present when drilling multiple wells from offshore platforms because of the need to avoid intersecting existing wells which are often very close to the well being drilled and where, during the first few thousand feet of drilling a new well, the planned distance from a neighboring well might be as little as six feet. Since it is not always possible to exactly control the location or direction of a drill bit, during this initial phase of drilling and during the initial turning of the well to direct it toward its targeted point in the earth, the danger of accidentally intersecting a nearby well is particularly great.

Similar safety problems exist when a relief well is being drilled to intersect with an existing well, for example, to bring a blowout well under control. In such a situation, it is extremely important to guide the relief well accurately to the existing, or target, well while closely monitoring the distance between the two and the direction of the target well from the relief well, so that the intersection takes place at the desired location in the shortest possible time. Thus, proximity detection and directional measurements are extremely important from a safety standpoint both when avoiding existing wells during the drilling of a new well, and when locating and intersecting a target existing well, as When drilling a relief well.

Numerous techniques have been developed for guiding boreholes, as exemplified by U.S. Pat. No. 4,072,200 to Morris et al, Pat. No. 4,458,767 to Hoehn, and by the several patents issued to the applicant herein, including Pat. Nos. 4,323,848, 4,372,398, 4,443,762, 4,529,939, and 4,700,142. In the patents issued to the applicant herein, an alternating current is injected from an electrode into the earth surrounding the well being drilled to produce a current flow in the surrounding strata. At least a part of that current flow concentrates on the casing of a nearby existing well, which current produces an alternating magnetic field which can be detected from the borehole being drilled. The detection of this magnetic field permits a determination of the direction and distance to the existing well. Although this system works very successfully, there is a need for a method of making such measurements while the relief well is being drilled. Such "measurement while drilling" or "MWD" apparatus would permit a continual evaluation of the proximity of nearby wells, without the need for stopping drilling, withdrawing the drill from the borehole, and inserting the measuring equipment. As a result, significant savings in time and cost would be effected. Such an MWD operation would be particularly valuable during the latter stages of drilling a relief well to intersect a blowout well, when the wells may be just a few meters apart from each other and continuous measurements may be critical.

An important factor in the drilling of wells is the ability immediately to communicate any data obtained to the surface. Numerous telemetry systems have been developed for this purpose, with one of the most widely available systems utilizing apparatus for generating pressure pulses in the well drilling fluid at the bottom of the well. These pulses are then detected at the surface.

SUMMARY OF THE INVENTION

The present invention is directed to a method and apparatus for determining, while drilling a borehole, the distance and direction to an underground electrically conductive anomaly, such as an existing well casing in the vicinity of the borehole, through the use of a controlled primary alternating magnetic field generated by a source in the borehole. This magnetic field electromagnetically induces alternating current flow in the nearby existing well casing, and this current in turn generates a secondary alternating magnetic field whose direction and strength are measured by magnetic field sensing instruments in the borehole. The existing nearby well casing together with the drill stem in the borehole being drilled and the earth between the borehole and the existing well casing form the secondary winding of a transformer. The primary of the transformer is a winding wound on a core in the borehole; preferably, this core is a laminated toroid of mu-metal wound on the drill stem in the borehole being drilled. This drill stem passes through the center of the toroidal winding so that the magnetic field produced in the annular core induces a current flow in the secondary winding. The induced current follows a path through the drill stem, through the surrounding earth, and through the casing of the nearby existing well, and this path forms the single turn secondary winding for the transformer.

Alternatively, the primary magnetic field may be generated by a solenoid in the drill stem in the borehole being drilled, with the solenoid being used to magnetically link the nearby existing well casing and to thereby excite a current flow in it.

Further in accordance with the invention, a secondary magnetic field is generated by the current flow in the target well casing, and this field is detected at the well being drilled by a sensor which detects either the current flow directly or the secondary magnetic field generated thereby. For detection of the secondary magnetic field generated, the sensor may consist of a single AC magnetic field sensor perpendicular to the axis of the drill stem, or may consist of two independent AC magnetic field sensors whose axes of maximum sensitivity are perpendicular to each other and are also perpendicular to the drill stem. For direct detection of the current flow in the target well, a toroidal transformer on the drill stem in the borehole being drilled may be used, since a fraction of the current flow in the target (existing) well will have a return path on the drill stem in the borehole being drilled.

A single magnetic field sensor may consist of a pair of solenoids having coils wound on ferrite rods several inches long. The solenoids may be mounted in notches formed on the outer side wall of the drill stem, preferably on diametrically opposite sides of the drill stem. The solenoid coils are connected to be in resonance at the frequency of interest, their outputs are balanced, and they are connected so their outputs are additive for a uniform magnetic field in the vicinity of the drill stem on which they are mounted. In this way, they give a maximum response to the secondary field generated by the alternating currents on the nearby well casing, and give essentially no response to currents flowing on the drill stem on which they are mounted. The output of the sensor can be used to find the direction and magnitude of the alternating magnetic field vector in the plane perpendicular to the axis of the drill. To enhance the detection of the desired signal, the drill stem on which the sensors are mounted may be rotated, as is normally done in the course of drilling, so that the signal which is synchronous with the rotational frequency of the drill can be evaluated and related to the location of the nearby existing well casing. Location of the nearby well is further enhanced by the simultaneous use of two sensors perpendicular to each other and to the drill stem.

If a solenoidal magnetic field sensor is used to detect the secondary field, the two solenoids which make up such a sensor will be on opposite sides of the drill stem, and accordingly they will be at different distances (r) from the source of the secondary magnetic field. This allows the two solenoids to be used in a magnetic field gradient mode to directly determine the distance to the target.

The utilization of a source toroidal inductor surrounding the drill stem to produce the primary field which excites current flow on the nearby well casing and the use of either one or two pairs of solenoidal secondary field sensors is useful because the current induced on the existing well casing is independent of the rotational angle of the drill bit. Furthermore, the electromagnetic coupling in such a system is good and makes it possible to obtain a direct measurement of the direction to the nearby casing, as well as to obtain a measurement of the signal strength. This method of operation can be applied in an electromagnetically reciprocal manner, as well, wherein a solenoidal source is used to excite the magnetic field, as mentioned above, and wherein a toroidal current sensor is provided.

In an alternative form of the invention, a solenoidal source may be used to generate the primary magnetic field, as mentioned above. In this arrangement, the axis of the source is perpendicular to the drill stem, and a field sensor whose axis of maximum sensitivity is perpendicular to the axis of the source and to the axis of the drill stem may be used. In this configuration, the primary field of the source is suppressed in the sensor by the orthogonal configuration of the source and sensor coils. This arrangement suffers from the fact that the direction of the nearby well casing is ambiguous by is 180°, but for applications where this ambiguity is not serious, this configuration may be used. This configuration can also make use of a magnetic gradient mode connection of the sensing solenoids to obtain a direct determination of distance as discussed above.

The foregoing embodiments are well suited to incorporation into measurement while drilling systems. These systems are readily powered by batteries and the information provided is readily transmitted to the surface. To provide orientation of the drill stem and other information needed by a driller to set the tool face for further drilling, inclinometer data, earth's magnetic field measurements and measurements of the rotational orientation of the drill bit to the tool face may be made at the instant that the electromagnetic measurements are being made. All of the measured data are then supplied through an analog to digital (A/D) converter to the transmitter portion of a conventional telemetry system for transmission to the surface.

BRIEF DESCRIPTION OF THE DRAWINGS

The foregoing, and additional objects, features and advantages of the present invention will become apparent to those of skill in the art from the following detailed description of preferred embodiments, taken in conjunction with the accompanying drawings, in which:

FIG. 3 is a partial cutaway view of a toroidal inductor for use in the system of FIGS. 1 and 2;

FIG. 4 is a top view of an inductive magnetic field sensor for use in the system of FIG. 1;

FIG. 5 is a top view of a pair of inductive magnetic field sensors having their axes of maximum sensitivity at right angles to each other, for use in the system of FIG. 2;

FIG. 6 is a diagrammatic illustration of a modified form of the system of FIGS. 1 and 2;

FIG. 8 is a diagrammatic illustration of another embodiment of the system of FIG. 1;

FIG. 9 ia a diagrammatic illustration of current flow in the system of FIG. 1;

Figure 1:
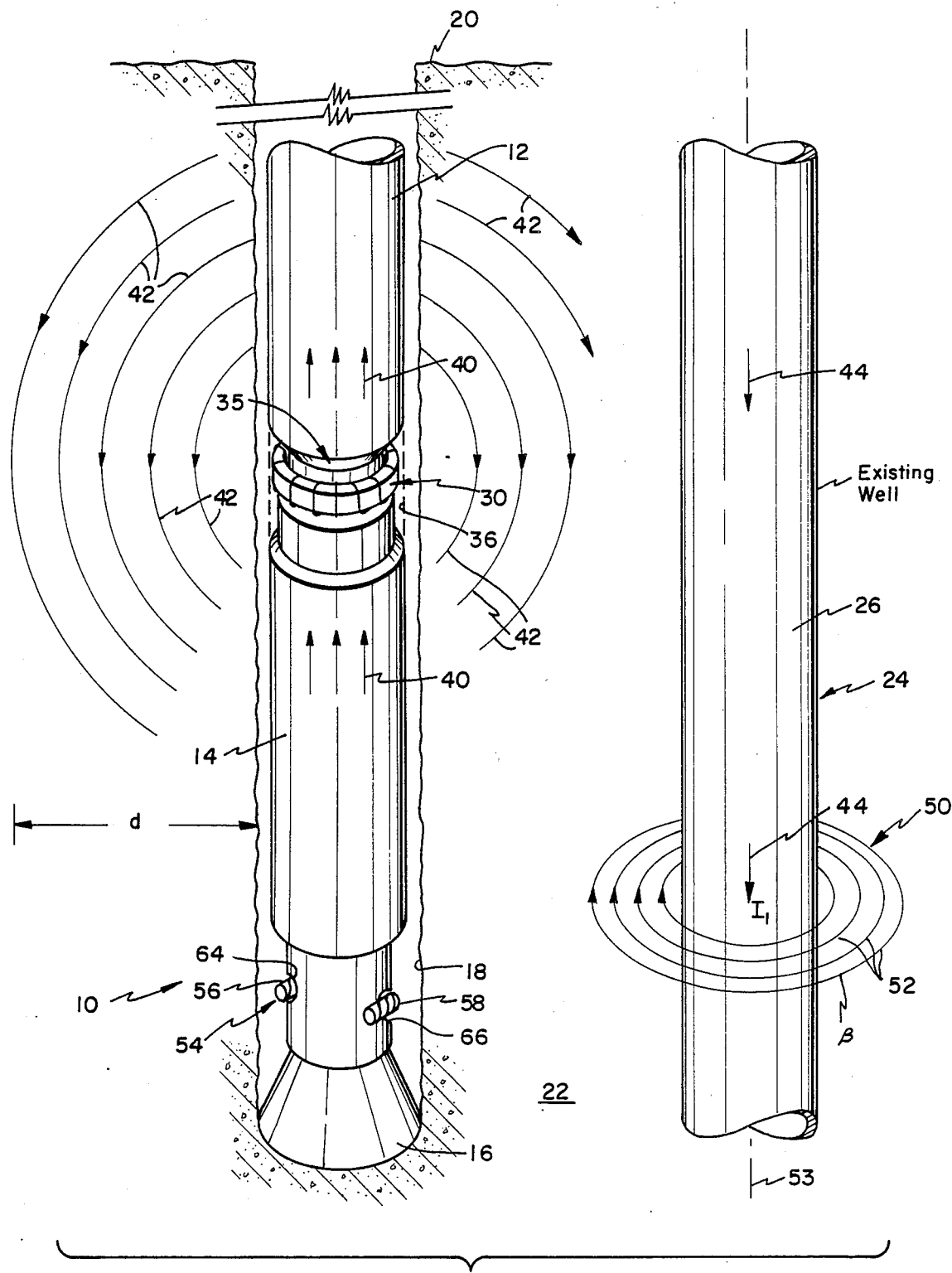
FIG. 1 is a diagrammatic illustration of a proximity detecting system utilizing electromagnetic induction for locating target wells from a well being drilled.
Figure 2:
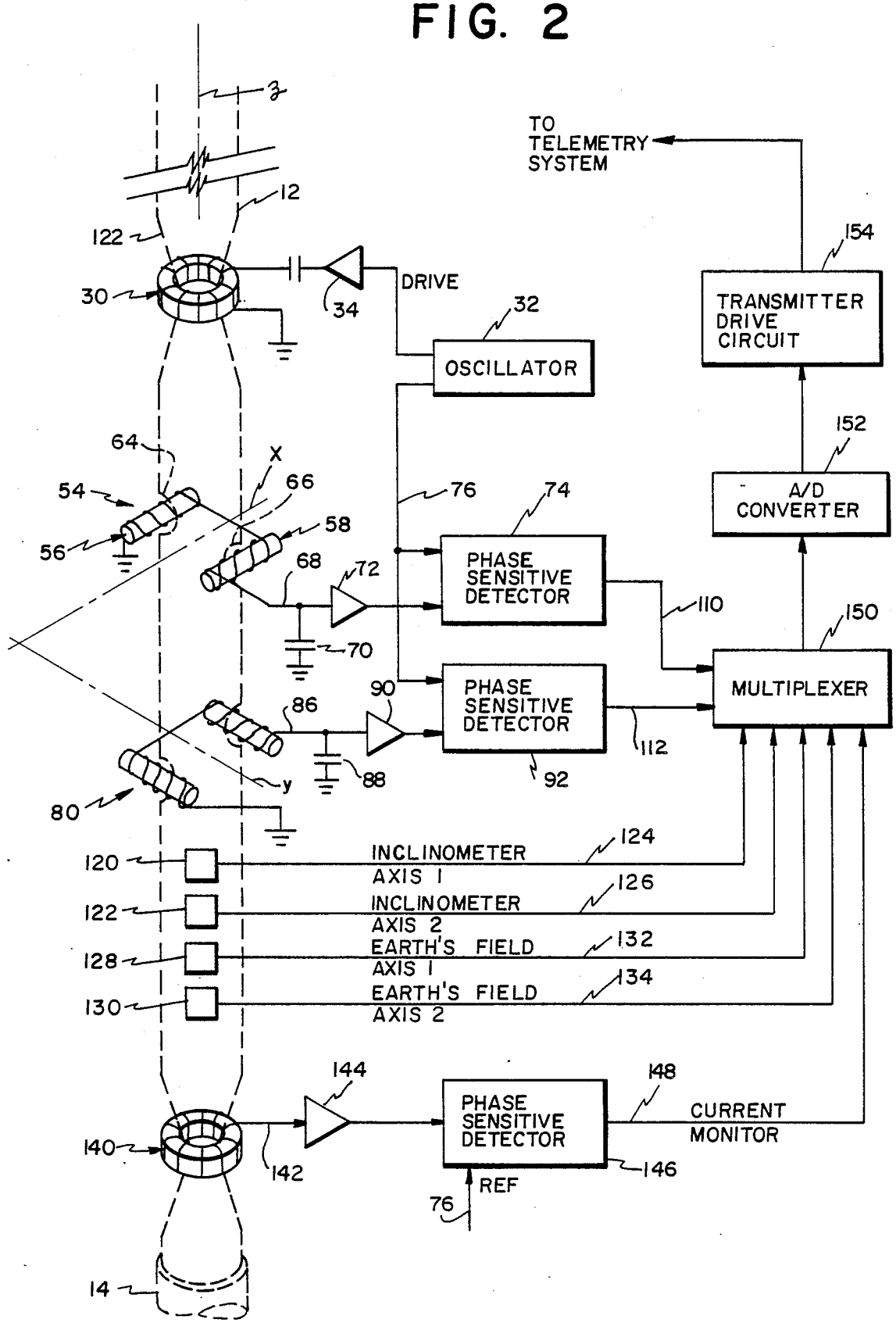
FIG. 2 is a diagrammatic illustration of a modified version of FIG. 1.

DESCRIPTION OF PREFERRED EMBODIMENTS:

referring now to FIGS. 1 and 2, there is illustrated at 10 a proximity detecting system for measurement of magnetic fields in accordance with the present invention. The system includes a drill stem 12 carrying at its lower end a drilling motor 14. Which is connected to drive a drill bit 16 in conventional manner. The drill stem is located in a borehole 18 being drilled from the surface 20 of the earth 22, and carries the proximity detecting equipment to be described.

The borehole 18 is illustrated as being drilled in the vicinity of an existing well 24 which incorporates a metal casing 26 or other electrically conductive material. The well 24 may be, for example, a blowout well which is to be brought under control, in which case the borehole 18 would be a relief well which is to be drilled to intersect the well 24 at a desired, or target, location below the surface of the earth. Alternatively, the well 24 may be a nearby existing well, which may be one of multiple wells drilled from a platform for example, and which is to be avoided during the drilling of borehole 18, in which case the drilling operation is controlled so as to avoid the existing well. In order to guide the drilling of the borehole either to avoid the existing well or to intersect it at a desired location, the proximity detecting system 10 is provided on the drill stem 12 so as to permit measurement of magnetic fields produced by current flow in the existing well, from which the direction to the well and its distance can be determined rapidly and accurately. Such measurements are made during the drilling operation, which has numerous advantages since MWD systems provide continuous measurements without the expense and delay of removing the drill stem.

The proximity detecting system 10 includes a current source in the form of a first inductor 80 mounted on the drill stem above the drill 16 and drill motor 14. This inductor is driven by an oscillator 32, such as that illustrated in FIG. 2, by way of a drive amplifier 84, both of which are battery-operated and both of which are mounted in a suitable housing (not shown) mounted on drill stem. The inductor 80 may be mounted in a region of reduced diameter, illustrated at 35, together with the circuit housing, and the entire assembly may be encapsulated by an epoxy in the region illustrated by dotted line 36, for example, for protection. As illustrated in FIG. 8, the inductor 80 preferably is annular in shape, having a wound core 37 surrounded by a toroidal winding 88. The core 87 preferably is formed from about 20 or 30 turns of a thin permalloy strip which form an annulus surrounding the drill stem 12, as illustrated in FIG. 1. The winding 38 may include, for example, 100 turns of wire wound around the annular core 37.

In one form of the invention, about one watt of power is supplied to the winding 88 by driver 84 at a frequency of a few kiloHertz; for example, 3 kiloHertz, to produce an annular AC magnetic field in core 37. This magnetic field may be referred to as the primary field and produces an AC current flow in the drill stem 12. The coil 38 thus serves as the primary winding of a transformer, while the metal of the drill stem 12 together with the surrounding earth forms a single turn secondary for the transformer. The one watt of power supplied to the coil 38 induces approximately 100 milliamps of current on a typical drill stem, assuming that the surrounding earth 22 has a resistivity of 1 ohm-meter. This resistivity is typical of many offshore environments. The induced current flow in the drill stem, indicated by the arrows 40, flows along the drill stem and gradually flows into the surrounding earth, the current flow in the surrounding earth formations being indicated by the arrows 42. The current in the earth formations will be dependent on the resistivity of the surrounding strata, and such current will tend to concentrate in any nearby electrically conductive anomaly, such as the well casing 26, and will produce therein an alternating current flow of several tens of milliamperes, indicated by arrows 44, with the casing thereby serving as part of the secondary circuit of the transformer.

The primary toroidal inductor 80 is mounted 8 to 12 meters above the drill bit 16 so that a sufficient amount of drill stem exists below the inductor to make current flow into the formations easy. In addition, this location positions the primary winding some distance away from the magnetic field sensors, to be described.

The radial distance d of penetration of the current 42 into the earth is dependent on a number of factors, including the conductivity of the earth's formations. This distance is the electromagnetic skin depth for the induced current, and the magnitude of the current flow indicated by arrows 44 in the existing well casing 26 depends upon the value of the skin depth. The propagation of the current indicated by lines 40 along the length of the drill stem 12 has a characteristic diffusion behavior which results in a reduction of the current on the pipe by a factor of 2.7 for each skin depth distance d along the length of the drill stem. This effect is true as long as the radius of the drill stem is much smaller than d, and in practice this is always the case. In the case of an earth formation with about 1 ohm meter resistivity, with an alternating current frequency of about 1 kiloHertz, the electromagnetic skin depth d is about 16 meters.

The current 44 flowing in the casing 26 of the nearby well 24 itself produces an alternating magnetic field generally indicated at 50. This field may be referred to as the secondary magnetic field, and has field lines 52 which surround the casing 26 and lie in a plane perpendicular to the axis 53 thereof. This secondary magnetic field is detected at the borehole 18 by an alternating magnetic field sensor generally indicated at 54 in FIG. 1 and shown in greater detail in FIG. 4. As there illustrated, the sensor 54 consists of two alternating magnetic field detectors 56 and 58. The detectors include ferrite rods 60 and 61, each several inches long and each surrounded by a corresponding solenoidal winding 62 and 63. The detectors preferably are mounted in reduced areas such as notches 64 and 66, respectively, formed in the side of the drill stem and located diametrically opposite to each other so that they are spaced apart by a distance approximately equal to the diameter of the drill stem. The detectors have their axes of maximum sensitivity parallel to each other and perpendicular to the axis of the drill stem 12.

In the embodiment of FIG. 1, the sensor 54 is located near the bottom of the drill stem so as to detect the secondary magnetic field as near the face of drill 16 as possible. Although this is not a completely satisfactory location for a sensor, because of the significant vibration that occurs at the drill head, nevertheless it may be desirable to locate the sensor there so as to obtain field measurements at the bottom of the borehole.

As illustrated in FIGS. 2 and 4, the windings 62 and 68 of the two detectors 56 and 58 are connected additively in series, with the winding output on line 68 being connected across a capacitor 70 and through an amplifier 72 to the input of a phase sensitive detector 74. The capacitor 70 combines with windings 62 and 63 to form a resonant circuit so that detectors 56 and 58 have maximum sensitivity to secondary magnetic fields generated by current in the nearby well 24. The outputs of the windings are additive for a uniform magnetic field 75 (FIG. 4) in the vicinity of the drill stem on which the detectors are mounted so as to give a maximum response to the field generated by currents in the nearby well casing. The location of the detectors insures that they will provide little or no response to the current 40 on the drill stem. The phase sensitive detector 74 also receives a reference input from the oscillator 32 by way of line 76.

As illustrated in FIGS. 2 and 5, two sensors such as the sensor 54 may be used to find the direction and magnitude of the alternating magnetic field vector at the drill stem 12 for the magnetic field 52 produced by current flow in the casing of the nearby well 24. In this embodiment, the sensors are shown as being located above the drill motor 14, and thus are located at least 80 feet above the drill face, 30 feet being the approximate length of the drill motor and drill head segment. The sensor 54, as discussed above, is arranged with its detectors 56 and 58 lying in a plane perpendicular to the axis of the drill stem 12 with each having its axis of sensitivity lying, for example, parallel to an X axis 78. A second sensor 80 also includes a pair of detectors, indicated at 82 and 84, which are similar to the detectors 56 and 58 and which have their axes parallel to a Y-axis 85 which is perpendicular to the X-axis of the sensor 54 and which is also perpendicular to the longitudinal axis Z of the drill stem. Sensors 54 and 80 may be vertically spaced along the axis of the drill stem, as illustrated in FIG. 2, or they may be located in a common plane, as illustrated in FIG. 5. The detectors 82 and 84 have their windings connected additively in series, with their output line 86 being connected across a capacitor 88 and through an amplifier 90 to a secnd phase sensing detector 92 (See FIG. 2). The phase sensitive detector 92 also receives by way of line 76 a reference signal from oscillator 32 at the frequency of the primary alternating magnetic field, which is the same as the frequency of the current generated by inductor 30 in drill stem 12; i.e. about 1 kiloHertz in this example.

To further enhance the signal obtained from the magnetic field produced by the nearby well casing 26, and to suppress outputs contributed by currents flowing on the drill stem, the drill stem 12 is rotated during measurement in the manner normally done in the course of drilling. Any signals having an amplitude variation which is synchronous with the rotational frequency of the drill can then be detected by a second synchronous phase detector, which may be located at the surface, and related to the direction of the nearby well casing.

The apparatus described above, which utilizes a toroidal magnetic field to excite current flow on a nearby target casing and which uses either a pair of solenoidal field detectors, such as the sensor 54 in FIGS. 1 or 4, or two pairs of solenoidal field detectors, such as the sensors 54 and 80 in FIGS. 2 and 5, is preferred because the current induced on the nearby well casing 24 by the toroidal transformer/inductor 30 is independent of the rotational angle of the transformer and thus is independent of the angle of rotation of the drill stem and drill bit. In addition, such an arrangement provides a very good electromagnetic coupling between the inductor source and the target well casing. This arrangement, even with a single sensor, permits a direct measurement of the direction to the nearby casing by rotating the drill stem, and also permits a measurement of the signal strength, from which the distance to the nearby well can be determined. With two sensors, the direction from the borehole 18 to the well casing 26 can be detected even without rotation of the drill stem. In the embodiment of FIG. 1, it will be noted that the sensor 54 rotates with the drill bit, for measurement while drilling, whereas the two sensor arrangement of FIG. 2 does not require rotation for measurement.

The system as described above in FIG. 1, for example, can also be used in an electromagnetically reciprocal manner, wherein a solenoidal source having the position and axis of one or both of the detectors 56 and 58, and which is located in a similar place on the drill stem may be used to excite a magnetic field which produces a current flow in the target well. A toroidal magnetic field sensor having a geometry similar to that shown for the source inductor 30 may be used to detect the secondary magnetic field. This configuration is mathematically similar to the configuration of FIG. 1, but in this case, care must be taken to balance the solenoids which act as the primary field source so that stray currents are not induced on the drill stem.

A further embodiment of the invention is illustrated in FIG. 6, wherein the primary field source and the secondary field sensor are both solenoidal. Thus, a source inductor 100 includes a pair of solenoids 102 and 104 mounted on opposite sides of the drill stem 12, each of the solenoids having a ferrite core surrounded by a winding, with the windings being connected additively in series and energized by oscillator 32 through amplifier 34. The solenoids 102 and 104 are parallel to each other, and the source inductor 100 has its axis 105 perpendicular to the longitudinal axis 106 of the drill stem 12. The magnetic field detector for the system is illustrated at 107 and is also mounted on the drill stem 12. This sensor is similar to that illustrated in FIGS. 1 and 2 at 54, and thus includes two parallel solenoidal detectors mounted on opposite sides of the drill stem. The sensor has its axis of maximum sensitivity 108 perpendicular to the axis 106 of the drill stem, and also perpendicular to the axis of sensitivity 105 of the source 100. This orthogonal configuration of the source, the sensor, and the axis of the drill stem suppresses the sensor's sensitivity to the primary field and the fields generated by any stray current on the drill stem. This is a practical configuration, although it suffers from the fact that the direction to a nearby target well casing would be ambiguous by 180°. However, for applications where this ambiguity is not serious, this configuration can be used.

An advantage of the use of solenoid field system of the type illustrated in FIG. 6 is that the two detectors for each sensor are located on opposite sides of the drill stem, and thus are at different distances from the source of the secondary magnetic field which is to be detected. Accordingly, the two detectors will measure slightly different field magnitudes, since the field strength is inversely proportional to the square of the distance from the source. This difference can be used to determine the field gradient from one detector to the other, and from this gradient the distance to the source can be calculated.

In the foregoing embodiments, the output appearing on output line 110 from the phase sensitive detector 74 and the output line 112 from detector 92 (FIG. 2) are signals which represent measured vector components of the secondary alternating magnetic field vector generated by the current flow in the target well. These vectors indicate the direction from the sensor or sensors carried on the drill stem to the target well casing, while the magnitude of the vector indicates the strength of the signal and from this the distance to the drill stem can be determined.

As illustrated in FIG. 2, the system of the present invention may also provide measurements of parameters other than the secondary magnetic field. Thus, for example, an inclinometer may also be mounted on the drill string, with X axis and Y axis sensors 120 and 122, respectively, providing outputs on lines 124 and 126 which are a measure of the vector components of the earth's gravitational field in the borehole. These outputs provide a measure of the slope of the borehole with respect to the vertical direction of the earth's gravitational field, and the rotational orientation of the instrument in the borehole. The system may also incorporate a compass at or near the bottom of the drill stem, with the compass producing outputs from its X and Y sensors 128 and 130, respectively, corresponding to the vector components of the earth's magnetic field. The sensor outputs appear on compass output lines 132 and 134.

In order to interpret the amplitude of the measurements obtained by the system of FIG. 2, without reliance on independent formation conductivity data, drill stem current monitor 140 may be mounted on the drill stem 12 near the sensors 54 and 80. This monitor may be in the form of a toroidal inductor such as the inductor 30, and is mounted on the exterior of the drill stem to measure the current flowing in the drill stem. The measured current is supplied by way of line 142 through amplifier 144 to a phase sensitive detector 146. The detector 146 also receives an input from oscillator 32 by way of line 76, to detect the current flow in the drill stem produced by oscillator 32 and source inductor 30, and to produce a corresponding output on line 148.

The output signals on lines 110, 112, 124, 126, 132, 134 and 148 are supplied by way of a multiplexer 150, an analog-to-digital converter 152 and a suitable transmitter drive circuit 154 to a conventional telemetry system (not shown) for transmission to a receiver and evaluation equipment at the earth's surface, where the data are interpreted and evaluated. The results of this interpretation provide information concerning the distant and direction to the nearby well from the borehole, and enable the driller to guide the further drilling of the borehole.

Figure 7:
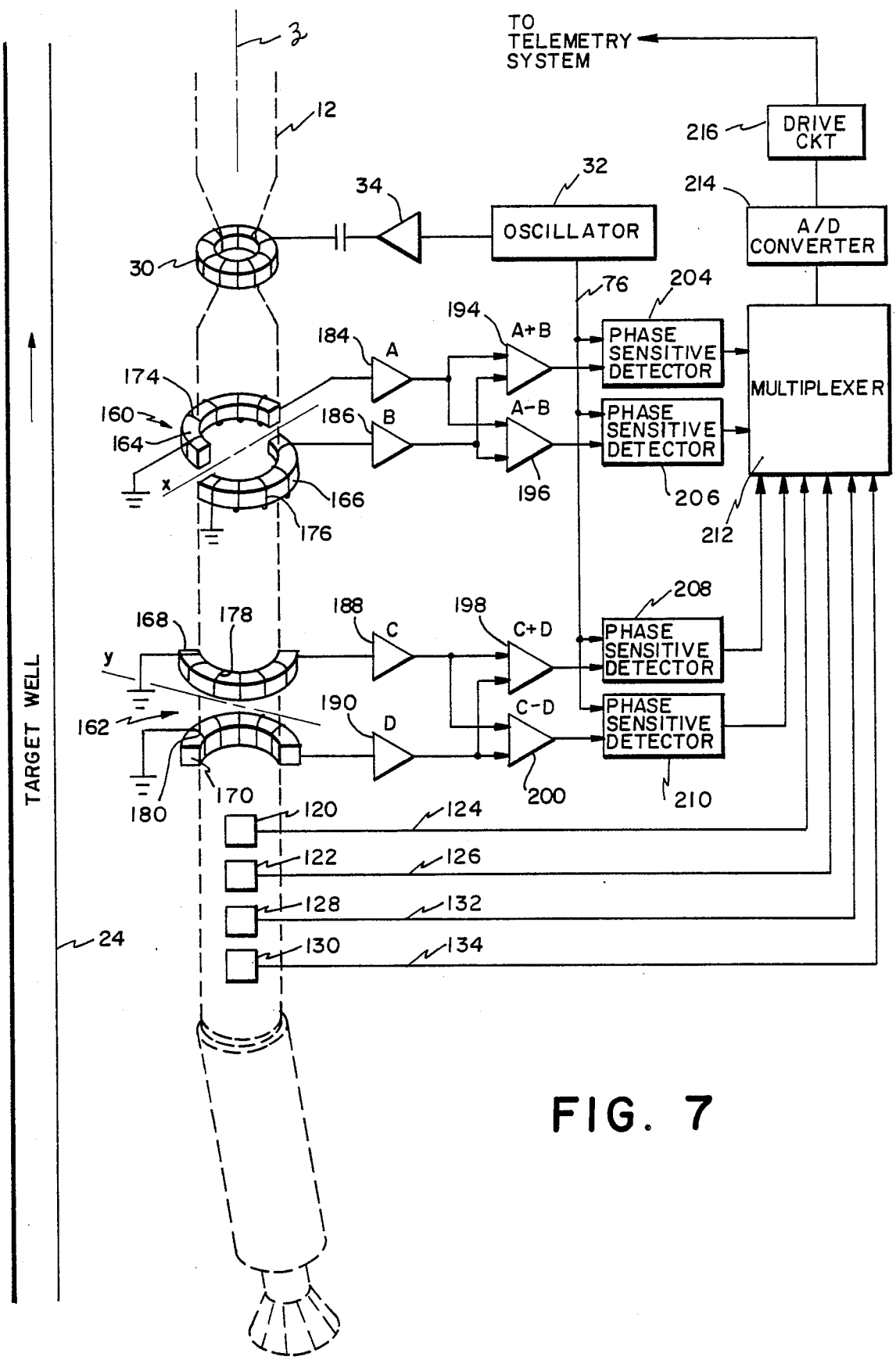
FIG. 7 illustrates another modified form of the system of FIG. 1.

FIG. 7 illustrates a further embodiment of the system of FIG. 2, wherein a toroidal source 80 is mounted on drill stem 12 and is driven by oscillator 32 to produce a current flow in the drill stem, as previously described. In this embodiment, sensors 160 and 162 are also mounted on the drill stem to sense the secondary magnetic field produced by current flow in a nearby electrically conductive anomaly such as well 24. The sensors consist of pairs of solenoidal detectors, the sensor 160 including detectors 164 and 166, and the sensor 162 including detectors 168 and 170. Each detector includes an arcuate core which is generally semicircular and sized to fit snugly around the outer surface of the drill stem 12. Preferably, the detectors are mounted in corresponding notches formed in the side wall of the drill stem so that the outer surfaces of the detectors are flush with the outer surface of drill stem 12. Coils 174, 176, 178 and 180 are wound around the cores of detectors 164, 166, 168 and 170, respectively, and are connected between ground and corresponding amplifiers 184, 186, 188 and 190 to produce output signals A, B, C and D. The detectors function in the manner described with respect to the detectors in sensors 54 and 80 in FIG. 2, providing output signals representing the secondary magnetic field vectors along X and Y axes which are perpendicular to the longitudinal Z axis of the drill stem.

The outputs from amplifiers 184 and 186 are supplied to sum and difference amplifiers 194 and 196, while the outputs from amplifiers 188 and 190 are supplied to sum and difference amplifiers 198 and 200. The output A+B from summing amplifier 194 is fed to a phase sensitive detector 204, the output A−B from difference amplifier 196 is fed to a phase sensitive detector 206, the output C+D from summing amplifier 198 is fed to a phase sensitive detector 208, and the output C−D from difference amplifier 200 is fed to phase sensitive detector 210. The detectors compare their respective inputs to the output of oscillator 32, which supplies a reference signal to each by way of line 76, and the outputs of the detectors are sent by way of multiplexer 212, analog-to-digital converter 214, and drive circuit 216 to a suitable telemetry system, for transmitting this data from sensors 160 and 162 to the surface.

Inclinometer detectors 120 and 122 and compass detectors 128 and 130 may also be incorporated in the device of FIG. 7, as previously described, with their outputs being supplied to multiplexer 212 for transmission to the surface.

In this embodiment, the windings on the detectors for sensors 160 and 162 are not connected together, as was the case in the device of FIG. 2, but are independently connected to corresponding sum and difference circuits, thereby permitting selection of the desired output signals at the surface. This arrangement also allows simultaneous measurement of the secondary magnetic field generated by the target and the current flow on the drill stem i.e., the electromagnetic coupling of the drill stem to the formation without the need for an additional toroid 140 as shown in FIG. 2.

A still further embodiment of the invention is illustrated in FIG. 8, and is the preferred form of the invention. Electromagnetically, this embodiment is the reciprocal of that shown in FIGS. 2 and 7, and the electromagnetic coupling of the drill stem to the formations is evaluated separately. As illustrated, a toroidal source 230 is mounted on a drill stem 12 in the manner described with respect to source 30 in FIGS. 1 and 2. The winding on the toroid 230 is connected to an oscillator power source 282 operating at a frequency $f_2$ by way of an amplifier 234. The oscillator excites the winding of toroid 230, to produce a primary magnetic field in its core. In turn, this field induces a component of current $I_2$ at the frequency $f_2$ in the drill stem $I_2$.

The current component $I_2$ in the drill stem flows out of the drill stem and into the surrounding earth 236. A measure of the earth's conductivity can be obtained by means of a toroidal sensor 240 mounted on drill string 12. The toroidal winding on sensor 240 produces a signal on line 242 which is fed through a band pass amplifier 244 to produce an output signal on line 246. This output signal is a measure of the current component of $I_2$ produced by toroidal source 230. The signal at frequency $f_2$ on line 242 is a function of the conductivity of the surrounding earth formation and of various drill string parameters. The current flow on the drill string is limited by the conductivity of the earth and the inductance of the drill string.

The nearby target detection system of FIG. 8 is the mathematical reciprocal of that found in FIGS. 1, 2 and 7 and incorporates a solenoidal magnetic field source 250 of the type illustrated at 100 in FIG. 6. Source 250 is mounted on the rotary drill head 251 and is energized by an oscillator 252 operating at frequency $f_1$, the output of which is connected through amplifier 254 and line 256 to the windings on solenoid 250. This solenoidal source generates an alternating primary magnetic field at frequency $f_1$ which induces a current flow $I_1$ in well 24. This current in turn produces an associated secondary current flow at frequency $f_1$ on the drill stem which is detected by toroid 240 and is amplified by amplifier 258 to produce output A on line 260. This output is proportional to the current in the excitation solenoid 250.

The primary magnetic field produced by the source 250 is also detected by a pair of solenoidal sensors 261 and 262 mounted on the drill string. These sensors are similar to sensors 54 and 80 illustrated in FIG. 2, and produce outputs on their corresponding output lines 264 and 266. These outputs are amplified in bandpass amplifiers 268 and 270, respectively, Which produce on lines 272 and 274 corresponding signals B and C at frequency $f_1$. Since the source 250 is mounted on the drill 251, it is rotated by the drill motor 14 with respect to the drill stem 12. Magnetic field sensors 261 and 262 respond to the primary field of the source 250, which varies with the instantaneous rotational angle of the drill bit.

The system of FIG. 8 preferably includes inclinometer sensors 280 and 282, and compass sensors 284 and 286 mounted on the drill stem. In this embodiment they are shown as being located above the magnetic field sensors 260 and 262. The magnetic field source 250 is located below the drill motor, in this embodiment, so that it is very close to the bottom of the borehole, and rotates with the drill bit. This system gives the distance and direction to the target from the drill bit, which is the point of greatest interest, with a very small amount of equipment being needed at the drill bit, where space is a premium.

All of the output signals shown in FIG. 8 and discussed above are supplied to a multiplexer 292, which samples them sequentially. The multiplexer output on line 298 is supplied through an A/D converter 300 to a microprocessor 302, which processes the outputs and sends them to surface equipment by way of conventional telemetry drive circuitry such as that indicated at 304.

Electromagnetically, the embodiment of FIG. 8 is the reciprocal of that shown in FIGS. 2 and 7. In FIG. 8 the measurement of the electromagnetic coupling to the target well 24 is effectively done by measuring the ratio between the current at frequency $f_1$ on line 256 which is supplied to the excitation solenoids 250 and the voltage on line 260 generated by the toroid 240. In the embodiment of FIG. 7 the ratio between the current injected into toroid 30 and the voltage differences A−B and C−D generated by solenoids 164, 166, 168 and 170 evaluates the corresponding coupling between the drill stem and the target well. In the embodiment of FIG. 8 the coupling of the drill stem and the formation is evaluated by the ratio of the current exciting toroid 230 at frequency $f_2$ and the voltage on line 246 generated by toroid 240. The corresponding coupling to the formations in the embodiment of FIG. 7 is the ratio of the current injected into toroid 30 and the voltage 142 generated by toroid 140.

In operation, the source solenoid 250 is activated by its own battery powered oscillator 252 to produce an alternating magnetic field at frequency $f_1$ which rotates with the drill bit 16. Current flow $I_1$ is thereby induced in the casing of a nearby well. The current flow $I_1$ in the well has an associated current flow $I_2$ in the drill string which is detected by toroidal sensor 240 at the drill string 12. The sensed current signal produces a voltage on line 242 at frequency $f_1$ which is amplified by amplifier 258 and is correlated by the microproceseor 802 with signals at frequency $f_1$ on lines 264 and 266 generated by the solenoidal sensors 261 and 262. The drill bit is rotated during this operation and measurements and correlations are made while drilling.

PRINCIPLES OF OPERATION

The physics which govern the operation of the apparatus and methods of this invention are the principles of electromagnetic induction and of the generation of magnetic fields by electric currents. A mathematical theorem of reciprocity shows that for any system described by Maxwell's equations, the ratio of an excitation current applied to the two terminals of port A of an electromagnetic system and the voltage thereby produced across the two terminals of port B of the system is identical to the ratio of current applied to the port B terminals and the voltage thereby produced across the port A terminals. Thus the physical considerations which describe applying a current to a toroid and measuring the voltage produced on a solenoid, i.e., FIGS. 1, 2 and 7, effectively also describes the reciprocal case of applying current to the solenoid and measuring the voltage on the toroid, i.e., FIG. 8. The case of solenoidal excitation and solenoidal field detection, i.e., FIG. 11, though closely related, must be treated separately.

Begin by considering the basis of the embodiment shown in FIG. 1, i.e, of current flow induced in the earth by a toroidal transformer a short distance above the drill bit and of magnetic field detection by a "balanced" solenoid at the drill bit. The physical phenomena are conveniently separated into two parts, that concerned with the flow of current from the drill stem into the Earth and onto the nearby target and that of the generation of magnetic fields to which the balanced solenoid detector responds.

In the absence of a nearby target, the balanced solenoidal detector shown in FIG. 1 will have a null response. The toroidal transformer produces a potential difference between the long upper drill stem and the short length of drill stem between the toroid and the detector. The resulting flow of current into the Earth from the lower portion of the drill stem and back to the upper portion is axially symmetric with respect to the drill stem and the magnetic field lines generated are circular and centered on the drill pipe. At the point of the sensor no magnetic field is generated by this current flow.

When a nearby target well is present, a current flow 44 flows on it as part of the current return path between the lower portion of the drill stem and the upper part. If $I_1$ denotes the current flow on the target directly opposite the solenoidal sensor, the magnetic field $\beta$ to which the detection solenoid responds is given, to a good approximation, by Amperes Law. Using the definition of directions and distance indicated in FIG. 8, the magnetic field $\beta$ generated by the system of FIG. 1 is given by $$\beta = \frac{\mu_o I_1}{2\pi r} \sin(\theta_t - \theta_1) \quad \text{(Eq. 1)}$$

The flow of current from the drill stem in the system of FIG. 1 is readily discussed in terms of circuit theory. The toroidal excitation transformer 30 produces a voltage difference between the upper drill stem and the lower part since they are the secondary winding terminals of this one turn transformer. If the lower part of the drill stem between the transformer and the drill bit is short it will have a relatively high resistance to "ground", i.e. a point in the Earth far away from the drill stem, compared to the impedance of the upper portion which by virtue of its great length has a much better connection to "ground". For this case the lower portion of the drill stem can be viewed as an electrode which has been raised to a potential above ground by the transformer. For a given excitation of the transformer, i.e. for a given voltage produced the resulting current flow on the drill stem is, in this case, directly proportional to the electrical conductivity of the formations ($\sigma$). The current flow from the drill stem is registered by the voltage generated by toroid 140 in FIG. 2 The ratio between this voltage and the excitation current in the excitation toroid 30, in principal, can always be related to the formation conductivity. If the length of the lower portion of the drill stem is not short, i.e., is not significantly less than an electromagnetic skin depth $$\sqrt{2/\omega\mu_0\sigma},$$

then the relation between this ratio and the formation conductivity is more complex.

Given the formation conductivity the distance between the drill stem and target well and the length of the "electrode" portion of the drill stem below the toroid, computation of the current flow on the target well can be carried out. The measurements can then be analyzed in a self consistent manner to evaluate the unknown parameters, e.g., the distance r between the target and the drill stem.

In fact the ratio between the current excited on the drill stem in the mode of operation shown in FIGS. 1, 2 and 7 and the current flow $I_1$ opposite the detection solenoid is usually relatively insensitive to variations of either the formation conductivity or distance between the wells. Consider the current flows of the embodiment shown in FIG. 1 as depicted in FIG. 9.

The total current $I_0$ emitted into the formations by the "electrode" portion of the drill stem 12 below the toroid 30 eventually returns to the upper drill stem by several routes to form a complete electrical circuit. A portion of the current $I_0$ flows directly around the toroid and back to the upper drill stem as indicated by $I_3$ A second path Is shown as $I_4$ which is between the electrode portion of the drill stem and the target above the depth where the drill bit and magnetic sensor 54 are. Finally there is the current depicted as $I_5$ which is the fraction of the current which flows from the electrode portion of the drill stem to the target below the sensor depth. The currents $I_4$ and $I_5$ flow up the target well and then back to the drill stem above the toroid 80 to complete their path. Only the current $I_5$ produces a magnetic field to which the solenoidal magnetic sensor 54 responds.

The relative division of the total current $I_0$ between the paths $I_3$, $I_4$ and $I_5$ is relatively insensitive to the value of the formation conductivity since the resistance associated with each path is, to a first approximation, dependent upon the formation conductivity in the same way, i.e. each resistance is inversely proportional to it. The electrical resistance between two cylinders separated by a distance much greater than the cylinder radii is relatively insensitive to the distance between the cylinders because of the logarithmic dependence of this resistance on the ratio of separation distance to cylinder radius. Thus, for a large fraction of the cases of interest the ratio of $I_5/I_0$ is relatively constant.

The above analysis presupposes a uniform Earth. Often the non-uniformity is not of great consequence; however, in those cases when it is of consequence, then more sophisticated modelling of the current flow in the Earth is readily done in a manner well known in the art.

Values of the measurement of $V_1$, $I_0$ and B are readily combined to determine the distance and the direction to the target well. The manner in which signals from two orthogonal sensors, e.g. 261 and 262 in FIG. 8, are combined to find the vector direction of a field is disclosed in my Pat. No. 4,372,398. The manner in which AC field magnitude and direction data generated by target well currents are combined with inclinometer and Earth field magnetometer data to give directions in space is disclosed in my Pat. No. 4,700,142 issued October 13, 1987.

The physical considerations discussed above together with the mathematical reciprocity theorem of Maxwell's equations effectively describe the embodiments shown in FIGS. 1, 2, 7 and 8.

The embodiment shown in FIG. 8 has an additional feature not described above or in the patents referenced. The solenoidal excitation apparatus 250 located on the drill bit has no circuit connection to the apparatus or circuitry located above the drill motor. In particular, there is no phase reference connection between the oscillator 252 and the rest of the apparatus. Instead of using a phase referenced system this embodiment uses a correlation technique to determine direction.

In the embodiment shown in FIG. 8 current flow $I_1$ is induced on the target by the magnetic flux generated by the source solenoid pair 250. Focusing on directional and time dependencies we can write:

$$I_1 \alpha \sin(\theta_t - \theta_1)\cos 2\pi f_1 t \qquad \text{(Eq. 2)}$$

where $\alpha$ denotes proportionality. The current flow depicted as $I_1$, flows up the target well, out into the formation, and returns to the target well below the depth of the excitation solenoid to complete the current path. Part of the current $I_1$ in the formations flows to and concentrates on the drill stem as current $I_2$ and then flows back through the formation to complete the current path by returning to the target well. As in the case of FIGS. 1, 2 and 7 described above, the fraction of the current $I_1$ which appears as current $I_2$ is measured by toroid 240 as voltage signal A. Thus, focusing on directional dependencies $$A \alpha I_1 \alpha \sin(\theta_t - \theta_1)\cos 2\pi f_1 t \qquad \text{(Eq. 3)}$$

The signals registered by primary field detection solenoids 261 and 262 depend from on relative rotation angle between the drill bit and these sensors, i.e., $$B \alpha \cos(\theta_1 - \theta_2)\cos 2\pi f_1 t \qquad \text{(Eq. 4)}$$

$$C \alpha \sin(\theta_1 - \theta_2)\cos 2\pi f_1 t \qquad \text{(Eq. 5)}$$

The technique to find direction is to use the microprocessor to correlate A and B and A and C. By correlate is meant multiplying the instantaneous values of A and B together and A and C together and then averaging over many rotations of the drill bit; i.e. over values of $\theta$ so that:

$$<AB> \alpha \sin(\theta_2 - \theta_t) \qquad \text{(Eq. 6)}$$

$$<AC> \alpha \cos(\theta_2 - \theta_t) \qquad \text{(Eq. 7)}$$

Thus the direction to the target relative to 261 and 262 is given. Using these two expression and the methods described in U.S. Pat. No. 4,700,142 the direction to the target relative to space can be found.

Figure 11:
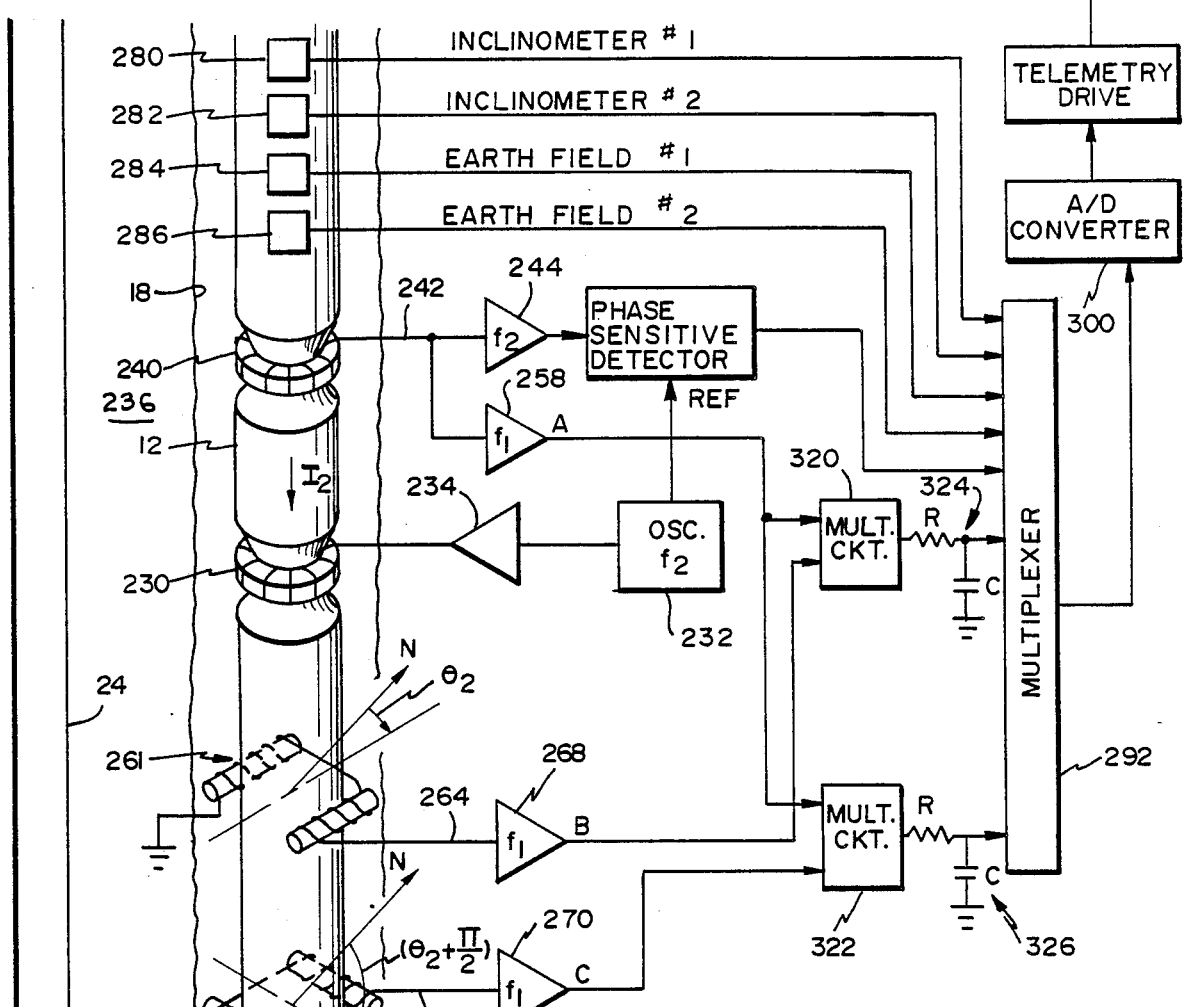
FIG. 11 is a diagrammatic illustration of still another embodiment of the system of FIG. 1.
Figure 10:
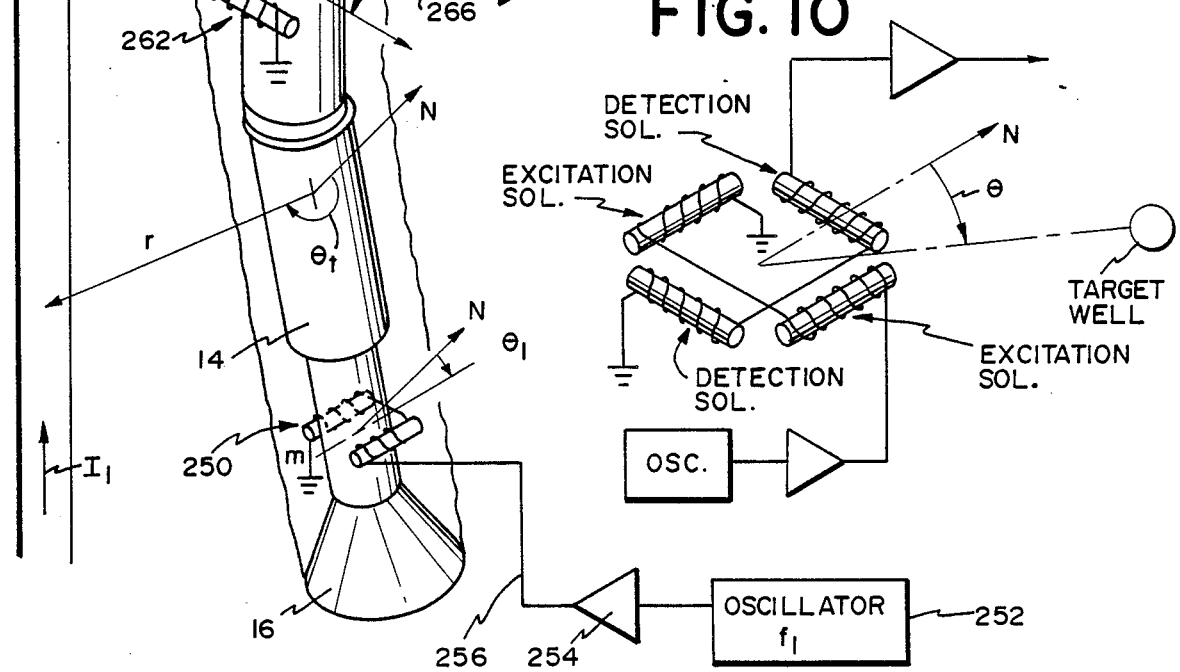
FIG. 10 is a diagrammatic illustration of the relationship between the excitation and the detection solenoids in the system of FIG. 8.

The above is also readily done with hardware by employing mixture circuitry, i.e., multiplier circuits as shown in FIG. 11. Thus, FIG. 11 shows the same drill stem components as FIG. 8, and similar components carry the same identifying numbers. In FIG. 11 the signals B and C from the drill bit rotation sensors 161 and 262 at frequency $f_1$ are fed into multiplier circuits, or mixers, 320 and 322, respectively, together with the signal component A at frequency $f_1$ from toroid 240. As in the embodiment of FIG. 8 the excitation solenoid pair 250 is balanced so that no current flow is generated on the drill stem 12 in the absence of a target well casing 24. If a small residual current is left after balancing it can be identified by noting the constant signal output as the rotational orientation of the entire drill stem 12 is charged. The outputs of the multipliers 820 and 322 are supplied through RC filters 324 and 326 to the multiplexer 292.

For the case of current excitation on the target well by a solenoid and the detection of the field generated by a second solenoid with axis perpendicular to the first (see FIG. 6) the physics is slightly different.

In this case the excitation solenoid induces current flow on the target well given approximately by:

$$I = \frac{V_1}{2Z} \text{ where } Z = \sqrt{\frac{i\omega\mu_o}{\sigma}} \ln\frac{\delta}{a} \quad \text{(Eq. 8)}$$

$$\text{and } V_1 = \frac{i\omega\mu_o m}{r} \sin\theta$$

where $V_1$ is the voltage associated with the magnetic flux of the excitation solenoid which links the target well, i.e., the flux which passes behind the target well. The excitation solenoid has magnetic moment m, $\theta$ is the angle between the radius vector and the axis of the solenoid as shown in FIG. 11.

The voltage $V_2$ is induced on the detection solenoids whose magnetic flux collection area is A is given by:

$$V_2 = \frac{i\omega A I \cos\theta}{Z 2\pi r} = \frac{\omega^2 A \mu_o m}{Z 4\pi r^2} \sin\theta \cos\theta \quad \text{(Eq. 9)}$$

$$= \frac{\omega^2 A \mu_o m}{Z 2\pi r^2} \sin 2\theta$$

Thus the voltage sensed varies as $2\theta$, i.e., there is an intrinsic 180° ambiguity in direction between the solenoids and the target well. Because of the $1/r^2$ distance dependence, a sharply rising signal intensity will be apparent when the wells are close. This may be useful as an alarm warning to signal an imminent collision between two wells.

Thus, there has been disclosed unique devices and methods for inductively generating currents for us in determining the distance and direction to target wells. Although the invention has been described in terms of preferred embodiments, it will be apparent that numerous modifications and variations may be made without departing from the true spirit and scope thereof, as set forth in the accompanying claims.

What is claimed is:

1. An electromagnetic detection system for locating, from a borehole being drilled, an underground elongated conductive body, comprising:
   a borehole;
   a drill stem within said borehole;
   an elongated conductive body located in the earth near said borehole;
   a source toroidal inductor including a toroidal winding, said source inductor being mounted on and surrounding said drill stem and inductively coupled thereto;
   AC source means connected to said toroidal winding to energize said source inductor with alternating current, said winding acting as the primary of a transformer to induce a secondary current in a transformer secondary including said drill stem, the earth surrounding said borehole, and said conductive body;
   magnetic field sensor means including a pair of solenoidal detectors each including a core and a winding surrounding said core, said detector being mounted on opposite sides of said drill stem so as to be responsive to secondary magnetic fields generated by said secondary current flowing in said conductive body but essentially nonresponsive to magnetic fields generated by secondary current flowing in said drill stem;
   circuit means connected to said sensor means, including means producing a data signal corresponding to any sensor output;
   means mounted on said drill stem producing signals indicating the orientation of said drill stem; and
   means for transmitting said data signals and said orientation signals to the surface of the earth.

2. The system of claim 1, wherein said drill stem carries a rotatable drill bit, said pair of solenoid detectors being mounted on said drill stem for rotation therewith, whereby the direction from said drill bit to said conductive body is determinable from said data signals.

3. The system of claim 2, wherein said solenoid detectors are responsive to the field strength of said secondary magnetic field to provide a measure of magnetic field gradient, whereby the distance from said drill bit to said conductive body is determinable from said data signals.

4. The detection system of claim 1, wherein said detector windings are additively connected to each other to produce a sensor output signal corresponding to said secondary magnetic fields, and wherein said circuit means includes phase sensitive detector means for comparing said sensor output signal to said source alternating current to produce an output data signal.

5. The detection system of claim 1, wherein said detector windings produce first and second sensor output signals corresponding to said secondary magnetic fields, and wherein said circuit means includes:
   summing means for adding said first and second sensor output signals to produce a sensor summing output;
   first phase detector means for comparing said summing output to said source alternating current to produce a first output data signal;
   difference means for obtaining the difference between said first and second sensor output signals to produce a sensor difference output; and
   second phase detector means for comparing said difference output to said source alternating current to produce a second output data signal.

6. An electromagnetic detection system for locating, from a borehole being drilled, an underground elongated conductive body, comprising:
   a borehole;
   a drill stem within said borehole;
   an elongated conductive body located in the earth near said borehole;
   a source toroidal inductor including a toroidal winding, said source inductor being mounted on and surrounding said drill stem and inductively coupled thereto;
   AC source means connected to said toroidal winding to energize said source inductor with alternating current, said winding acting as the primary of a transformer to induce a secondary current in a transformer secondary including said drill stem, the earth surrounding said borehole, and said conductive body;

magnetic field sensor means comprising first and second sensors, each said sensor having an axis of maximum sensitivity, the axes of maximum sensitivity being at right angles to each other and to a longitudinal axis of said drill stem, said sensor means being mounted on said drill stem so as to be responsive to secondary magnetic fields generated by said secondary current flowing in said conductive body but essentially nonresponsive to magnetic fields generated by secondary current flowing in said drill stem;

circuit means connected to said sensor means, including means producing a data signal corresponding to any sensor output;

means mounted on said drill stem producing signals indicating the orientation of said drill stem; and means for transmitting said data signals and said orientation signals to the surface of the earth.

7. The detector system of claim 6, wherein each of said first and second sensors comprises a pair of solenoidal detectors, each detector including a core and a winding surrounding said core.

8. The detector system of claim 7, wherein the detector windings of each pair of solenoidal detectors are connected additively to produce first and second sensor output signals, each corresponding to the vector of said secondary magnetic field which is parallel to the axis of maximum sensitivity of the corresponding sensor.

9. The detector system of claim 8, wherein said circuit means includes phase sensitive detector means for comparing said first and second sensor output signals to said source alternating current to produce first and second output data signals.

10. The detector system of claim 7, wherein the windings of said first sensor pair of solenoidal detectors produce first and second sensor output signals corresponding to the vector of said secondary magnetic field which is parallel to the axis of maximum sensitivity of said first sensor, and wherein the windings of said second sensor pair of solenoidal detectors produce third and fourth sensor output signals corresponding to the vector of said secondary magnetic field which is parallel to the axis of maximum sensitivity of said second sensor.

11. The detector system of claim 10, wherein said circuit means includes:

first and second summing means connected to said first and second sensors, respectively, said first summing means adding said first and second sensor output signals to produce a first summing output, and said second summing means adding said third and fourth sensor output signals to produce a second summing output;

first and second difference means connected to said first and second sensors, said first difference means obtaining the difference between said first and second sensor output signals to produce a first difference output, and said second difference means obtaining the difference between said third and fourth sensor output signals to produce a second difference output; and phase sensitive detector means for comparing each of said first and second summing outputs and each of said first and second difference outputs to said source alternating current to produce first, second, third and fourth sensor data output signals respectively.

12. The detector system of claim 11, wherein said means for transmitting said data signals includes multiplexing means connected to select said first, second, third and fourth data signals sequentially for transmission.

13. The detector system of claim 6, further including current sensor means mounted on said drill stem and responsive to current flow in said drill stem.

14. The detector system of claim 13, wherein said current sensor comprises a toroidal winding surrounding said drill stem, said winding producing a current sensor output in response to alternating current flow in said drill stem.

15. The detector system of claim 14, further including phase detector means connected to said current sensor winding for comparing said current sensor output to said source alternating current to produce a current monitor data signal.

16. An electromagnetic detecting system for locating, from a borehole being drilled, an underground elongated conductive body, comprising:

a borehole;

a drill stem within said borehole;

an elongated conductive body located in the earth near said borehole;

a first source toroidal inductor including a toroidal winding, said source inductor being mounted on and surrounding said drill stem and inductively coupled thereto;

first AC source means connected to said toroidal winding to energize said source inductor with alternating current, said winding acting as the primary of a transformer to induce a secondary current in a transformer secondary including said drill stem, the earth surrounding said borehole, and said conductive body;

a second source inductor mounted on said drill stem, said second inductor comprising first and second solenoids having parallel axes and mounted on opposite sides of said drill stem;

second AC source means having a frequency different from the frequency of said first AC source means and drivingly connected to said solenoids to produce a solenoidal primary magnetic field in the earth surrounding said borehole, said solenoidal primary producing a current at the frequency of said second AC source in said conductive body, which produces a secondary magnetic field at said AC second source frequency in the earth surrounding said borehole;

magnetic field sensor means mounted on said drill stem so as to be responsive to secondary magnetic fields generated by said secondary currents flowing in said conductive body but essentially nonresponsive to magnetic fields generated by secondary currents flowing in said drill stem;

circuit means connected to said sensor means, including means producing a data signal corresponding to any sensor output;

means mounted on said drill stem producing signals indicating the orientation of said drill stem; and means for transmitting said data signals and said orientation signals to the surface of the earth.

17. The detector system of claim 16, wherein said magnetic field sensor means includes first and second sensors, each having an axis of maximum sensitivity at right angles to each other and to a longitudinal axis of said drill stem.

18. The detector system of claim 17, wherein said circuit means includes filter means connected to said magnetic field sensor means, said filter means passing only sensor output signals at said solenoid frequency.

19. The detector system of claim 18, further including toroidal current sensor means mounted on said drill stem and responsive to alternating current flow in said drill stem to produce a current monitor data signal.

20. The detector system of claim 19, further including filter means connected to said toroidal sensor for restricting the response of said toroidal sensor to alternating current having the frequency of said first-named AC source.

21. An electromagnetic detection system for locating, from a borehole being drilled in the earth, an underground elongated conductive body, comprising:
   a borehole;
   an elongated drill stem having a longitudinal axis and located within said borehole, said drill stem carrying at the bottom of the borehole a rotatable drill head;
   an elongated conductive body located in the earth near said borehole;
   a primary field solenoidal inductor mounted on said drill stem adjacent said drill head;
   an AC source operating at a first frequency drivingly connected to said solenoidal inductor to produce a primary magnetic field alternating at said first frequency in the earth surrounding said borehole, at least a part of said primary field intersecting said elongated conductive body to produce therein a secondary current flow at said first frequency, said secondary current flow producing a secondary magnetic field at said first frequency;
   first and second magnetic field sensors mounted on said drill stem at a location spaced from and above said solenoidal inductor, said first and second sensors each having an axis of maximum sensitivity, and having their axes at right angles to each other and to said longitudinal axis of said drill stem, said sensors being responsive to vector components of said secondary magnetic field which are parallel to said axes of maximum sensitivity to produce corresponding sensor output signals;
   bandpass means connected to said first and second sensors to restrict the output thereof to signals having said first frequency;
   a toroidal source inductor mounted on said drill stem;
   to said toroidal inductor to produce a current flow in said drill stem at said second frequency;
   a toroidal current sensor mounted on said drill stem adjacent said toroidal source inductor and responsive to current flow in said drill stem to produce a corresponding toroidal sensor output;
   bandpass means connected to said toroidal sensor for restricting said toroidal sensor output to said second frequency;
   multiplexer means for selecting each of said sensor outputs sequentially; and
   circuit means for transmitting said outputs.

22. An electromagnetic measurement while drilling system for locating, from a borehole being drilled, an underground target elongated conductive body, comprising:
   a borehole being drilled and having an axis, said borehole containing a drill stem and a rotatable drill bit mounted axially therein;
   an elongated target conductive body in the earth near said borehole;
   a source solenoid including a core and a solenoidal winding surrounding said core mounted on said drill stem near said drill bit, said source solenoid having an axis perpendicular to the axis of said borehole;
   means energizing said source solenoid with alternating current to produce a magnetic field in the earth surrounding said borehole and to thereby produce a current in said conductive body;
   sensor means mounted on said drill stem to detect secondary magnetic fields generated by said current in said conductive body;
   circuit means connected to said sensor means, including means producing a data signal corresponding to any sensor output; and
   means transmitting said data signals to the surface of the earth.

23. The detection system of claim 22, wherein said sensor means is a sensor solenoid having an axis of sensitivity, said solenoid being mounted on said drill stem with its axis perpendicular to the axes of said borehole, said sensor solenoid being responsive to said secondary magnetic field.

24. The detection system of claim 22, wherein said sensor means is a sensor toroid mounted on and surrounding said drill stem, said sensor toroid being responsive to secondary current produced in said drill stem by said current in said conductive body.

25. The detection system of claim 22 further including means on said drill stem for determining the conductivity of the earth surrounding said borehole being drilled.

26. The detection system of claim 25, wherein said means for determining the conductivity of the earth comprises a source toroid mounted on and surrounding said drill stem for producing a corresponding current in said drill stem and in the earth surrounding said borehole, and wherein said sensor means includes a sensor toroid responsive to current produced by said source toroid.

27. The detection system of claim 26, wherein said sensor means further includes solenoid means mounted on said drill stem, said sensor solenoid means having an axis of sensitivity perpendicular to the axis of said borehole.

28. The detection system of claim 27, wherein said sensor toroid is further responsive to current produced in said drill stem by said source solenoid.

* * * * *

UNITED STATES PATENT AND TRADEMARK OFFICE
CERTIFICATE OF CORRECTION

PATENT NO. : 4,933,640
DATED : June 12, 1990
INVENTOR(S) : Kuckes

It is certified that error appears in the above-identified patent and that said Letters Patent is hereby corrected as shown below:

column 19, between lines 50-51 insert

--an AC source operating at a second frequency drivingly connected--

Signed and Sealed this

Sixteenth Day of July, 1991

*Attest:*

HARRY F. MANBECK, JR.

*Attesting Officer*     *Commissioner of Patents and Trademarks*